United States Patent Office 3,539,643
Patented Nov. 10, 1970

3,539,643
POLYENE COMPOUNDS
Ulrich Manz, Basel, and Ulrich Schwieter, Reinach, Switzerland, assignors to Hoffmann-La Roche Inc., Nutley, N.J., a corporation of New Jersey
No Drawing. Filed Jan. 16, 1967, Ser. No. 609,312
Claims priority, application Switzerland, Jan. 28, 1966, 1,233/66
Int. Cl. C07c 49/04, 49/20
U.S. Cl. 260—593                 3 Claims

ABSTRACT OF THE DISCLOSURE

Ethers of polyene diketo compounds which are useful as coloring agents for foodstuffs, pharmaceutical preparations and cosmetic preparations and a method for preparing these diketo ether compounds. The method of preparing these diketo ether compounds is carried out by condens a $C_{30}$ dialdehyde with a monoketone ether.

BACKGROUND OF THE INVENTION

This invention relates to coloring agents and the use of these coloring agents in coloring materials such as foodstuffs, pharmaceuticals and cosmetics. This invention also relates to a method of producing these coloring agents including intermediates in the preparation thereof.

Of the pigments of natural or synthetic origin which are suitable for coloring foodstuffs, β-carotene and the apocarotenals derived from natural pigments have been found to be particularly useful. However, various disadvantages impose a limit on the general use of these pigments. This is seen by the fact that the color tones achieved with these pigments lie within a relatively narrow range which extends from yellow-orange to yellow-red. Intermediate tones, can of course, be obtained by mixing various components. However, such mixtures of pigments are not color-constant when, as is frequently the case, the individual components are unstable or differentially stable. These pigments also vary their color with increasing dilution. In the case of carotene, for example, an undesirable color-shift to a pale yellow is observed with decreasing concentration. The desired saturated tints may often only be achieved by high concentrations, which are associated with high costs and are therefore uneconomical.

SUMMARY OF THE INVENTION

The present invention is concerned with polyene compounds of the general formula:

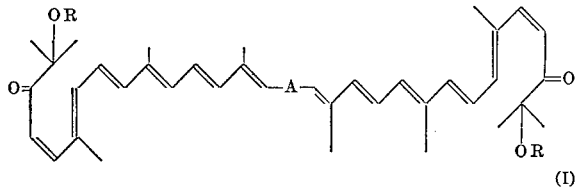

(I)

in which R representas hydrogen or a lower alkyl group and A is either —C≡— or —CH=CH—, and process for their production which are utilized as coloring agents for foodstuffs, pharmaceutical and cosmetic preparations.

The substituents in the formula shown above which are designated as lower alkyl are lower alkyl residues having from 1 to 4 carbon atoms such as methyl, ethyl, isopropyl.

The process in accordance with the invention where the polyene dialdehyde compounds of the Formula I above was prepared, is carried out by reacting a dialdehyde of the formula:

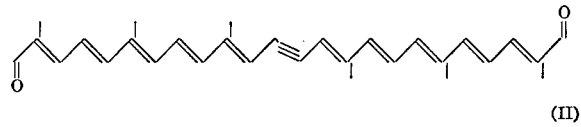

(II)

with at least 2 moles of a compound of the general formula:

(III)

in which R has the significance given above, with the help of an alkaline condensation agent in the presence of an inert solvent and, if desired, the product obtained partially hydrogenated at the triple bond and isomerized.

Of the products of Formula I and the polyene compounds manufacturable therefrom by partial hydrogenation and isomerization, 2,6,10,14,19,23,27,31-octamethyl-2,31-dimethoxydotriaconta - 4,6,8,10,12,14,18,20,22,24,26, 28-dodecaen-16-yne-3,30-dione which imparts to foodstuffs, phamaceutical and cosmetic preparations an intensive Bordeaux-red color, as well as 2,6,10,14,19,23,27,31-octamethyl-2,3-dimethoxydotriaconta - 4,6,8,10,12,14,16, 18,20,22,24,26,28-tridecaen-3,31-dione which imparts to foodstuffs, pharmaceutical and cosmetic preparations a violet color, are especially valuable.

It has now been found the polyene compounds of the Formula I above, including the partially hydrogenated products, posses a Bordeaux-red to violet color. They accordingly enrich the small palette of the physiologically inoffensive foodstuff-pigments. The compounds are stable in known use forms and they are distinguished from other materials with related color properties in that the tint is not influenced by the concentration. Surprisingly, the solutions of these substances retain their color character unaltered even in strong dilution. The compounds of Formula I are accordingly suitable in an outstanding manner for coloring foodstuffs, pharmaceutical and cosmetic preparations.

DETAILED DESCRIPTION

The coloring agents of Formula I above, in accordance with this invention, can be use to color any conventional foodstuff including beverages, fruits, vegetable preserves, marmalades, cream foods, confectionery, edible fats, cheese, fish products, pasta, soup powders, etc. Any conventional pharmaceutical preparation can be colored by compounds of Formula I. Among the typical pharmaceutical preparations which can be colored in accordance with this invention are included dragée, suppositories, gelatin capsules and syrups. Also any conventional cosmetic preparation can be colored with the compounds of Formula I above. Among the conventional cosmetic preparations which can be colored in accordance with this invention are included, toothpaste, skin creams, lipsticks and non-alcoholic mouthwashes.

In coloring materials such as foodstuffs, cosmetic and pharmaceutical preparations, the compounds of Formula I above should be added to the material in an amount sufficient to impart a color to the material. Generally, it is preferred that the foodstuff, pharmaceutical and cosmetic preparation contain from about 0.0000001 part by weight to about 0.1 part by weight of compound of Formula I above based on the weight of the foodstuff, pharmaceutical and cosmetic preparation. It is suitable to make the amount of compounds of Formula I to be added dependent on the nature of the preparations to be colored. Thus, for coloring foodstuffs, it is advantageous to add from about 0.0000001 part by weight to about 0.0001 part by weight of compound of Formula I based on the weight of the preparation (e.g. about 0.000002 part by weight to about 0.000005 part by weight are used for coloring beverages, such as carbonated beverages, about 0.00001 part by weight to about 0.000025 part by weight are used for coloring ice creams, confectionary etc. and 0.00001 part by weight to about 0.00005 part by weight are used for coloring yogurts). In the cosmetic field preferably about 0.0000001 part by weight to about 0.05 part by weight of compound of Formula I are used based on the weight of the cosmetic preparation (e.g. from about 0.001 part by weight to about 0.05 part by weight are used for coloring lipsticks and from about 0.0000001 part by weight to about 0.00002 part by weight are used for coloring creams, such as skin creams, toothpaste etc.). Pharmaceutical preparations, such as suppositories and syrups preferably contain from about 0.000005 part by weight to about 0.001 part by weight based on the weight of the preparation. In case of coloring dragées, the coating suitably contains from about 0.001 mg. to about 0.1 mg. of compound of Formula I per cm.$^2$ surface of the dragées. Although greater amounts than the parts by weight of the compound of Formula I specified above can be incorporated into the foodstuff, pharmaceutical or cosmetic preparation, however, these high amounts are seldom utilized since no additional benefits, as far as color is concerned, is obtained by utilizing such large amounts of the compounds of Formula I above.

The polyene compounds of Formula I can be employed for coloring foodstuffs, pharmaceutical and cosmetic preparations both in the original crystalline form and in a particular water-soluble form.

The polyene compounds of Formula I above can chiefly be used in the crystalline form for coloring fats and oils, as well as fat-containing substances such as, for example, marzipan, suppositories, lipsticks. The polyene compounds of Formula I above, can, for example, be dissolved in oils without further ado. Prior to the addition of the pigment, hard or soft fats are conveniently liquified by heating. Brushable fats may also be colored by kneading-in an oily pigment-solution. Marzipan, which, for example, is thoroughly kneaded with a solution of the polyene compound of Formula I in an almond oil, can also be colored in the same way. Colored suppositories and lipsticks can, for example, be manufactured in such a way that the polyene compound used as the pigment is stirred into the liquified carrier mass prior to filling into the molds.

For coloring fat-poor or fatless substances, there is generally used a water-dispersible form of the polyene compounds of Formula I. The preparation of these compounds in water dispersible form can be carried out by any of the techniques disclosed in U.S. Pat. 2,861,891, Bauernfeind et al. and U.S. Pat. 3,110,598, Muller et al. These include dissolving the polyene compounds of Formula I in a suitable solvent, homogenizing the solution (together with a stabilizer and a solubilizing or emulsifying agent if required, as well as with an animal or vegetable fat if desired) with water in the presence of a protecting colloid and evaporating the emulsion formed to dryness under reduced pressure.

Any conventional organic solvent capable of dissolving the compound of Formula I above, can be utilized. These solvents include volatile halogenated hydrocarbons such as, for example, chloroform, carbon tetrachloride, methylene chloride, etc. Any conventional antioxidatively active stabilizers can be utilized. These antioxidants include tocopherols, 2,6-ditert-butyl-4-hydroxytoluene [BHT], butylhydroxyanisole [BHA].

The salts of fatty acid esters of ascorbic acid (e.g., the sodium salt of ascorbyl palmitate), inter alia, have been found to be active as solubilizing agents. Any of the conventional solubilizing agents can be utilized in accordance with this invention. Concerning emulsifying agents, any conventional emulsifying agent can be utilized in accordance with this invention. The polyoxyethylene derivatives of sorbitan anhydrides partially esterified with fatty acids [Tweens] or non-ionogenic derivatives of fatty compounds with polyoxyethylene derivatives [Cremophores] are, for example, usable. The protecting colloids in which the compounds of Formula I are emulsified or dispersed include any of the conventional water soluble gelable colloids. Gelatin, dextrin, pectin, tragacanth, guar (especially in the presence of saccharose, glycerin, sorbitol), have, for example, been found to be useful as protecting colloids. The color brilliance of the aqueous solutions can be increased by the addition of any animal fat (e.g., beef tallow) or vegetable oil (e.g., groundnut oil).

The linkage or condensation of the compounds of Formula II above, and II above, to produce a compound in accordance with Formula I above, is carried out in an inert solvent in the presence of an alkali condensation agent. In carrying out this condensation reaction, temperature and pressure are not critical and the reactions can be carried out at room temperature and atmospheric pressure or at elevated, temperatures and reduced pressure. If quicker reaction times are desired, it is preferred to utilize elevated temperatures such as between 40 and 60° C. Generally in carrying out the condensation reaction, 1 mole of a compound of Formula II above is condensed with 2 moles of a compound of Formula III above. If desired, a molar excess of the compound of Formula III above can be utilized, that is, i.e., from about 2 moles to about 4 moles of the compound of Formula III per mole of the compound of Formula II. Generally, more than 4 moles of the compound of Formula III per mole of the compound of Formula II above are seldom utilized since no additional beneficial results are achieved thereby.

Any conventional inert solvent can be utilized in carrying out the condensation reaction of compounds of Formulas II and III. Typical solvents which can be utilized in accordance with this invention include benzene, toluene, xylene, dimethylformamide, methylene chloride, dichloro-ethylene, etc. Any conventional organic or inorganic alkali can be utilized as the condensation agent in accordance with this invention. Thereby, alkalis under which may be used alkali metal or alkali earth metal hydroxides. Of the alkali metal hydroxides which can be utilized in the process of the conversion of potassium hydroxide or sodium hydroxide are preferred.

The condensation of the compounds of Formula II above, with compounds of the Formula III above, produce a compound of Formula I where A is —C≡C—. This may be reduced to a compound where A is —CH=CH— by an conventional partial hydrolyzation technique. For example, the compounds of Formula I above where A is —C≡C— can be catalytically hydrogenated in an inert solvent such as ethyl acetate, toluene or petroleum ether in the presence of a selective hydrogenation catalyst, e.g., a palladium-lead catalyst in the presence of quinoline, of the type disclosed in the publication Helv. Chim. Acta, 35, 446 (1952). However, if desired, the compound of Formula II can be partially hydrogenated in the above manner prior to reaction with compounds of Formula III to reduce the single bond therein to a double bond.

The 2,6,10,15,19,23 - hexamethyl-tetracosa-2,4,6,8,10,14,16,18,20,22-decaen-12-yne-1,2,4 - dial of Formula II above, which is employed as a starting compound in the processes of this invention, can be manufactured by chain lengthening a suitable lower membered dialdehyde. This chain lengthening is carried out by condensing 1 mole of 2,7-dimethyl-octa-2,6-dien-4-yne-1,8-dial with 2 moles of acetalized 3,7 - dimethyl - 8-oxo-octa-2,4,6-trienylphosphonium bromide. The condensation compounds of Formulas II and III above which are preferred are 3-methyl-3-hydroxy-2-butanone and 3-methyl - 3 - methoxy-2-butanone.

The invention is further illustrated by the following examples.

EXAMPLE 1

(A) Preparation of ether 175 g. of crude 5 - (1-methoxy-1-methylethoxy)-3-methyl-pent-3-en-1-yne are introduced in a rapid stream into a solution of lithium amide in liquid ammonia.

The ammonia-alkaline lithium amide solution can be manufactured as follows:

0.5 g. of finely divided lithium are introduced with stirring into 600 ml. of liquid ammonia. After the addition of 0.5 g. of iron (III) nitrate, compressed air is led into the solution for a few seconds. As soon as the blue color of the solution has disappeared, a further 7.1 g. of finely divided lithium are added. The evaporating ammonia is condensed in a condenser charged with acetone/Dry Ice and led back to the reaction mixture. The mixture is stirred until the blue color disappears [15 to 60 minutes].

The dark clear reaction solution is stirred for 90 minutes, then treated with 170 ml. of dry toluene and immediately subsequently with 114 g. of 3-ethoxy-2-methylacrolein in a rapid stream and further stirred for 30 minutes. The mixture is subsequently neutralized by the addition of 80 ml. of glacial acetic in 200 ml. of toluene. The acid solution is conveniently added through a dropping funnel of which the exit tube dips into the reaction mixture. The ammonia is evaporated off, with stirring, until the temperature in the reaction vessel has risen to 40° C. The toluene is subsequently distilled off under reduced pressure. The residual 1-ethoxy-8-(1-methoxy - 1 - methylethoxy) - 2,6 - dimethyl - octa - 2,6-dien-4-yn-3-ol is a light-brown oil. U.V. maximum [in ethanol]; 228 m$\mu$; $\epsilon$=18000; $n_D^{20}$=1.5120; $d.$=1.002.

The 5-(1-methoxy-methylethoxy)-3 - methyl - pent - 3 - en-1-yne employed as starting compound can be manufactured as follows: 96 g. of 3-methyl-pent-2-en-4-yn-1-ol are, after the addition of 0.5 ml. of 10 percent methyl alcoholic p-toluenesulphonic acid, treated with stirring and cooling at 5 to 15° C. with 79 g. of isopropenyl methyl ether. The acetal is not isolated, but further processed directly.

(B) Preparation of hydroxy compound 270 g. of 1-ethoxy-8-(1-methoxy-1-methylethoxy)-2,6-dimethyl-octa-2,6-dien-4-yn-3-ol are dissolved in 400 ml. of toluene and, with cooling and strong stirring, treated with 50 ml. of 2 percent sulphuric acid and 50 ml. of methanol, in doing which the temperature should not exceed 25° C. The reaction mixture is subsequently stirred at 20 to 25° C. with nitrogen gassing for 2 hours. The toluene phase is separated, washed with 400 ml. of a 10 percent aqueous sodium sulphate solution and subsequently with 400 ml. of a 5 percent sodium hydrogen carbonate solution. The aqueous phases are separated and one more shaken out with 100 ml. of toluene. The combined toluene extracts are concentrated at 50° C. to a volume of 400 ml. The 2,6-dimethyl-8-hydroxy-octa-2,6-dien-4-yn-1-al dissolved in toluene can be acylated without isolation as described hereinafter. The toluene solution can also be completely evaporated and the residue crystallized from dibutyl ether. The 2,6-dimethyl-8-hydroxy-octa-2,6-dien-4-yn-1-al thus obtained melts at 32–34° C.

(C) Hydrogenation of ester 5.0 g. of 2,6-dimethyl-8-hydroxy-octa-2,6-dien-4-yn-1-al are dissolved in 30 ml. of toluene and, after the addition of 0.4 g. of a palladium/calcium carbonate catalyst deactivated by addition of lead and quinoline [Helv. Chim. Acta, 35 (1952), 446], hydrogenated up to the uptake of 1.05 equivalents of hydrogen. The reaction solution, after separation of the catalyst, is successively washed with 0.5 N sulphuric acid, potassium hydrogen carbonate solution and water, then dried over sodium sulphate and treated with a solution of 0.02 g. of iodine in 2 ml. of toluene. The solution is allowed to stand at room temperature for 18 hours and is subsequently successively washed with a 5 percent sodium thiosulphate solution and water, then dried over sodium sulphate and evaporated under reduced pressure. The residual 2,6-dimethyl-8-hydroxy-octa-2,4,6-trien-1-al melts at 70 to 72° C. after recrystallization from ethyl ether/petroleum ether [boiling range 30 to 40° C.].

(D) Preparation of 3,7-dimethyl-8-oxo-octa-2,4,6-trienyl triphenyl phosphonium bromide A mixture of 10.5 ml. of dimethylformamide and 45 ml. of methylene chloride is treated with stirring at —20° C. with 6.5 ml. of phosphorous tribromide and thereupon within 20 minutes with a solution of 16.6 g. of 8-hydroxy-2,6-dimethyl-octa-2,4,6-trien-1-al in 25 ml. of methylene chloride. The reaction mixture is stirred at —10° C. for 1 hour, then poured in ice-water and extracted with 300 ml. of ether. The ether extract is washed twice with ice-water, three times with ice-cold 10 percent potassium hydrogen carbonate solution and twice with ice-water, briefly dried over sodium sulphate and immediately evaporated under reduced pressure at 20° C. The residual 8-bromo-2,6-dimethyl-octa-2,4,6-trien-1-al crystallizes after trituration with a little ether, M.P. 68–70° C.; absorption maximum (in petroleum ether) 311 m$\mu$. Without further purification, the unstable compound is immediately dissolved in 50 ml. of methylene chloride and treated with 26 g. of triphenyl-phosphine. In doing so, the solution warms up to boiling. After 1 to 1½ hours, 200 ml. of acetic acid ethyl ester are slowly added while scratching with a glass rod. The 3,7-dimethyl-8-oxo-octa-2,4,6-trienyl triphenyl phosphonium bromide crystallizing out is filtered off in the cold after standing for 12 hours. M.P. 203–205° C.; absorption maximum (in ethanol) 315 m$\mu$;

$$E_{1 cm.}^{1\%} = 970.$$

EXAMPLE 2

44 g. of 3-methyl-3-methoxy-2-butanone are introduced into a solution of 10 g. of 2,6,10,15,19,23-hexamethyl-tetracosa - 2,4,6,8,10,14,16,18,20,22 - decaen-12-yne-1,24-dial in 500 ml. of methylene chloride and treated dropwise within 2 hours with a solution of 5 g. of potassium hydroxide in 50 ml. of methanol. The reaction mixture is subsequently heated to 50° C. in a nitrogen atmosphere, stirred for 24 hours, then cooled and poured into ice-cold N sulphuric acid. The methylene chloride phase which separates is successively washed with water, with an aqueous sodium hydrogen carbonate solution and again with water, dried over sodium sulphate and evaporated under reduced pressure. The violet 2,6,10,14,19,23,27,31-octamethyl-2,31-dimethoxy - dotriaconta - 4,6,8,10,12,14, 18,20,22,24,26,28-dodecaen - 16 - yne - 330 - dione which remains behind melts at 217–219° C. after recrystallization twice from methylene chloride/ethanol; U.V. maxima (in chloroform) 304, 355, 509, 536 (shoulder) m$\mu$;

$$E_{1 cm.}^{1\%} = 225, 408, 2450, 1910.$$

The dialdehyde employed as starting compound can be manufactured as follows:

100 g. of 3,7-dimethyl-8-oxo-octa-2,4,6-trienyl triphenyl phosphonium bromide, prepared in Example 1, in 160 ml. of abs. methanol are treated with 20 ml. of ortho-formic acid trimethyl ester and a solution of 0.1 g. of p-toluenesulphonic acid and 0.1 ml. of 85% phosphoric acid in 20 ml. of abs. methanol and allowed to stand at room temperature for 18 hours. The acetal formed which is present in solution is treated with stirring with 5 ml. of pyridine and immediately thereafter simultaneously with a solution of 8 g. of sodium in 200 ml. of abs. methanol and a solution of 16.2 g. of 2,7-dimethyl-octa-2,6-dien-4-yne-1,8-dial in 200 ml. of benzene. The reaction mixture is heated to 50° C. for 4 hours, then diluted with water and extracted with methylene chloride. The methylene chloride extract is washed neutral, dried over sodium sulphate and evaporated. The crude 2,6,10,15,19,23-hexamethyl - tetracosa - 2,4,6,8,10,14,16,18,20,22 - decaen-12-yne-1,24-dial tetramethyl acetal which remains behind is dissolved in 400 ml. of acetone and after the addition of 50 ml. of N sulphuric acid, heated to boiling for 45 minutes. The dialdehyde which precipitates in violet crystals on cooling melts at 227–229° C. after recrystallization from methylene chloride/ethanol; U.V. absorption maxima (in chloroform) 274, 325, 485, 517 m$\mu$;

$$E^{1\%}_{1\,cm.} = 290, 625, 2890, 2270.$$

EXAMPLE 3

10.3 g. 2,6,10,14,19,23,27,31 - octamethyl - 2,31 - dimethoxydotriaconta - 4,6,8,10,12,14,18,20,22,24,26,28-dodecaen-16-yne-3,30-dione are dissolved in 500 ml. of methylene chloride and, after the addition of 5 g. of palladium/calcium carbonate catalyst partially poisoned by lead- and quinoline-addition, 0.5 ml. of quinoline and 2 ml. of triethyl amine, hydrogenated until no more hydrogen is taken up. The catalyst is filtered off. The filtrate is successively washed with N sulphuric acid, with water, with an aqueous sodium hydrogen carbonate solution and again with water, dried over sodium sulphate, filtered and evaporated under reduced pressure. The residue is dissolved in 500 ml. of acetic acid ethyl ester and, after the addition of 200 mg. of iodine, heated to boiling under lighting with a 500 watt lamp for 3 hours. The 2,6,10,14,19,23,27,31-octamethyl - 2,31 - dimethoxy-dotriaconta-4,6,8,10,12,14,16,18,20,22,24,26,28-tridecaen - 3,30 - dione which precipitates in violet crystals after concentration of the solution to 150 ml. melts at 223–224° C.; U.V. absorption maxima (in carbon disulphide) 556 and 594 m$\mu$;

$$E^{1\%}_{1\,cm.} = 2065 \text{ and } 1590.$$

EXAMPLE 4

According to the same mode of working described in Example 2, there can be manufactured: from at least 2 moles of 3-methyl-3-hydroxy-2-butanone and 1 mole of 2,6,10,15,19,23 - hexamethyl-tetracosa - 2,4,6,8,10,14,16,18,20,22 - decaen-12-yne-1,24-dial, 2,6,10,14,19,23,27,31-octamethyl-2,31-dihydroxy - dotriaconta - 4,6,8,10,12,14,18,20,22,24,26,28 - dodecaen-16-yne-3,30-dione M.P. 245–247° C.; U.V. absorption maximum (in chloroform) 513 m$\mu$;

$$E^{1\%}_{1\,cm.} = 2950.$$

The use of polyene compounds of Formula I for coloring foodstuffs, pharmaceutical and cosmetic preparations in accordance with the invention can, using a representative member of this class of compounds, be elucidated by the following examples.

EXAMPLE 5

Manufacture of Bordeaux-red colored dragées 10,000 dragée kernels each of 150 mg. are covered white with sugar syrup, starch and talc up to a kernel weight of 190 mg.

30 g. of color-preparation containing 300 mg. of 2,6,10,14,19,23,27,31 - octamethyl - 2,31-dimethoxy-dotriaconta-4,6,8,10,12,14,16,18,20,22,24,26,28 - tridecaen-3,30-dione are soaked with 30 g. of water, combined with a solution from 330 g. of sugar and 135 g. of water which has been heated to boiling and subsequently cooled to 60–70° C. and homogenized. The violet-colored sugar solution is applied little by little to the white-coated dragées situated in the rotating coating-kettle, sprayed with cold air. The dragees are polished in the usual manner. The color layer of a dragee (weight 220 mg. diameter 1 cm., thickness 3 mm.) contains 0.03 mg. of the pure pigment named above.

The water-soluble preparation employed as color-dispenser can, for example, be manufactured as follows:

1 g. of a polyene compound of Formula I is dissolved in 100 ml. of chloroform and, together with 100 mg. of tocopherol, 2 g. of arachis oil and 2 g. of ascorbyl palmitate, introduced into a solution of 60 g. of gelatin, 35 g. of sugar and 0.5 g. of calcined soda in 250 ml. of water and homogenized. The colored chloroform-containing gelatin emulsion is poured on a metal sheet and subsequently dried in vacuum. The dry product is broken into small pieces.

EXAMPLE 6

Manufacture of violet-colored sweets 1 g. of purchasable fondant-composition is homogeneously mixed with a solution of 1.5 g. of color-preparation containing 15 mg. of 2,6,10,14,19,23,27,31-octamethyl-2,31 - dimethoxy-dotriaconta-4,6,8,10,12,14,16,18,20,22-24,26,28-tridecaen-3,30-dione [manufactured analogously to Example 5] in 5 ml. of water. In order to attain the desired fluidity of the compoistion, either invert-sugar syrup or powdered sugar is worked in as required. After heating the colored fondant, the violet glaze is applied to the article of confectionery or poured into starched molds. The lemon-yellow fondant fillings solidified in the starched molds are freed of starch dust and covered with chocolate.

EXAMPLE 7

Manufacture of pale violet colored ice cream 2 g. of color preparation containing 20 mg. of 2,6,10,14,19,23,27,31 - octamethyl-2,31-dimethoxy-dotriaconta-4,6,8,10,12,14,16,18,20,22,24,26,28 -tridecaen - 3,30-dione [manufactured analogously to Example 5] are dissolved warm in 5 ml. of water and added to the raw materials such as cream, milk, sugar, gelatin, aroma material necessary for 1 liter of ice cream. There is obtained a pale violet ice cream.

EXAMPLE 8

Manufacture of Bordeaux-red caramels 1.5 g. of color-preparation containing 15 mg. of 2,6,10,14,19,23,27,31 - octamethyl-2,31-dimethoxy-dotriaconta-4,6,8,10,12,14,16,18,20,22,24,26,28 - tridecaen - 330-dione [manufactured analogously to Example 5] are dissolved in 5 ml. of water and added towards the end of the cooking process or during the subsequent processing of 1 kg. of bon-bon composition and homogeneously worked in.

EXAMPLE 9

Manufacture of carbonic acid-containing cassis-colored refreshing drinks 4 g. of color-preparation containing 40 mg. of 2,6,10,14,19,23,27,31 - octamethyl-2,31-dimethoxy-dotriaconta-4,6,8,10,12,14,16,18,20,22,24,28 - tridecaen - 3,30 - dione [manufactured analogously to Example 5] are dissolved in 20 ml. of warm water and homogenized with 100 g. of sugar syrup. After the addition of citric acid and aroma materails, the colored solution is diluted to 10 liters with carbonic acid-containing water and filled into botles having stirrup-closures.

EXAMPLE 10

Manufacture of violet-brownish colored suppositories 100 g. of suppository composition are heated with 100 mg. of crystallized 2,6,10,14,19,23,27,31-octamethyl-2,31-dimethoxy-dotriaconta - 4,6,8,10,12,14,16,18,20,22,24,26, 28-tridecaen-3,30-dione up to complete solution of the pigment. α-Tocopherol, BHT, BHA, gallates etc. can be admixed as antioxidants. After working in the active material, the violet fatty composition is poured into the usual molds and allowed to cool.

EXAMPLE 11

Manufacture of violet-colored gelatin capsules 10 g. of color-preparation containing 100 mg. of 2,6,10,14,19,23,27,31 - octamethyl - 2,31 - dimethoxy-dotriaconta - 4,6,8,10,12,14,16,18,20,22,24,26,28 - tridecaen-3,30-dione [manufactured analogously to Example 5] are dissolved warm in 30 ml. of water and mixed with a hot gelatin solution consisting of 650 g. of gelatin, 250 g. of glycerine (which can also be partially replaced by sorbitol or other carbohydrates( and 800 g. of water. The gelatin capsules are manufactured in the usual manner from this gelatin solution according to the immersion or pressing process.

EXAMPLE 12

Manufacture of raspberry-red syrups and confectionery

Per kg. of syrup or confectionery, 2 g. of color-preparation containing 20 mg. of 2,6,10,14,19,23,27,31-octamethyl - 2,31-dimethoxy-dotriaconta-4,6,8,10,12,14,16,18,20,22,24,26,28 - tridecaen - 3,30-dione [manufactured analogously to Example 5] are dissolved warm in 5 ml. of water and added to the syrup or confectionary composition towards the end of the thickening process.

EXAMPLE 13

Manufacture of Bordeaux-red gelatin foods 2 g. of color-preparation containing 20 mg. of 2,6,10,-14,19,23,27,31 - octamethyl-2,31-dimethoxy-dotriaconta-4,6,8,10,12,14,16,18,20,22,24,26,28 - tridecaen-3,30-dione [manufactured analogously to Example 5] are dissolved in 6 ml. of warm water and stirred into 1 liter of the warm, liquid gelatin solution consisting of the usual ingredients. The solution is poured into molds and allowed to cool.

EXAMPLE 14

Manufacture of a weekly violet-colored daytime cream 1 g. of color-preparation containing 10 mg. of 2,6,10,-14,19,23,27,31 - octamethyl-2,31-dimethoxy-dotriaconta-4,6,8,10,12,14,16,18,20,22,24,26,28 - tridecaen - 3,30 - dione [manufactured analogously to Example 5] is dissolved in 65 ml. of warm water. The solution is emulsified in a salve base which consists of 15 g. of cetyl alcohol and octadecyl alcohol 3 g. of spermaceti, 1 g. of butyl stearate, 1 g. of lanolin, 5 g. of Cetiol, 2.8 g. of Corol, 8 g. of glycerin or propyleneglycol and 0.5 g. of perfume oil composition.

EXAMPLE 15

Manufacture of a raspberry-colored pudding composition 2 g. of color-preparation containing 20 mg. of 2,6,10,-14,19,23,27,31 - octamethyl-2,31-dimethoxy-dotriaconta-4,6,8,10,12,14,16,18,20,22,24,26,28 - tridecaen-3,30-dione [manufactured analogously to Example 5] are admixed with the pudding powder sufficient for 1 liter of completely prepared pudding and [the mixture] further processed as usual by stirring or boiling up with milk.

EXAMPLE 16

Manufacture of Bordeaux-red colored yogurt 2 g. of color-preparation containing 20 mg. of 2,6,10,-14,19,23,27,31 - octamethyl-2,31-dimethoxy-dotriaconta-4,6,8,10,12,14,16,18,20,22,24,26,28 - tridecaen-3,30-dione [manufactured analogously to Example 5] are dissolved warm in 5 ml. of water, mixed with 1 liter of milk and [the mixture] processed in the usual manner to [give] yogurt.

EXAMPLE 17

Manufacture of a Bordeaux-red marzipan composition 10 mg. of crystalline 2,6,10,14,19,23,27,31-octamethyl-2,31 - dimethoxy-dotriaconta-4,6,8,10,12,14,16,18,20,22,-24,26,28-tridecaen-3,30-dione are dissolved hot in 10 g. of almond oil, and, while still warm, worked into 1 kg, of marzipan composition manually or by machine. The marzipan composition can, if desired, also be colored with a water-soluble pigment preparation which, dissolved in a little water, is admixed with the marzipan composition.

EXAMPLE 18

Manufacture of a pale Bordeaux-red colored toothpaste 0.5 g. of pigment powder containing 5 mg. of 2,6,10,-14,19,23,27,31 - octamethyl-2,31-dimethoxy-dotriaconta-4,6,8,10,12,14,16,18,20,22,24,26,28 - tridecaen-3,30-dione [manufactured analogously to Example 5] are dissolved in 2 ml. of water and homogeneously worked into 100 g. of white toothpaste of the usual composition. The same pigment preparation can also be added, if desired, to the raw materials which are dissolved in water or converted into a paste with water.

What is claimed is:
1. Compounds of the formula

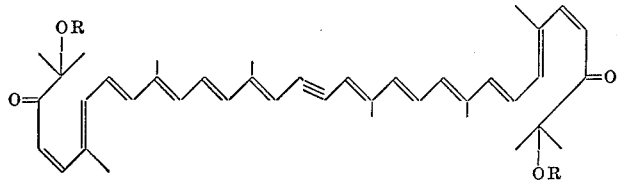

wherein R is selected from the group consisting of hydrogen and a lower alkyl group.

2. 2,6,10,14,19,23,27,31 - octamethyl-2,31-dimethoxy-dotriaconta - 4,6,8,10,12,14,18,20,22,24,26,28 - docecaen-16-yne-3,30-dione.

3. 2,6,10,14,19,23,27,31 - octamethyl-2,31-dihydroxy-dotriaconta - 4,6,8,10,12,14,18,20,24,26,28 - docecaen-16-yne-3,30-dione.

References Cited

Jackman: Acta. Chem. Scand., vol. 18(6), pp. 1404–1411 (1964).

Raphael: Adv. in Org. Chem., vol. 4, pp. 186 and 190–192 (1963).

BERNARD HELFIN, Primary Examiner

W. B. LONE, Assistant Examiner